Nov. 1, 1932.  L. M. PERSONS  1,885,285
HEAT MOTOR
Filed May 29, 1929  2 Sheets-Sheet 1

Inventor:
Lawrence M. Persons

Nov. 1, 1932.  L. M. PERSONS  1,885,285
HEAT MOTOR
Filed May 29, 1929  2 Sheets-Sheet 2
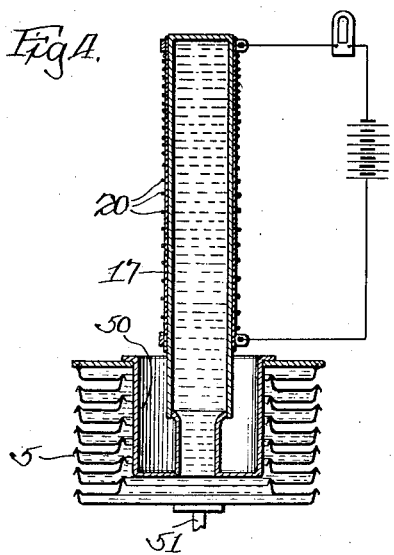
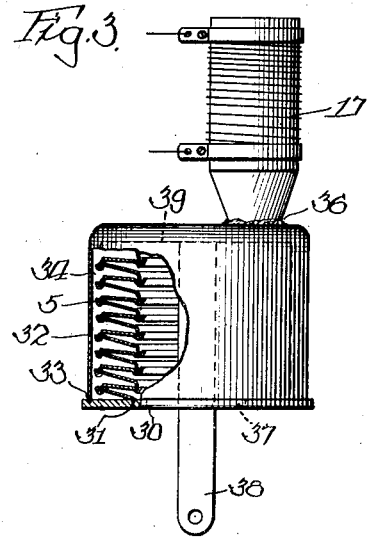
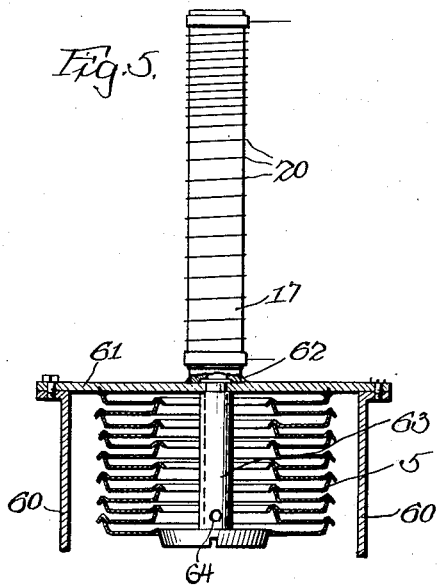
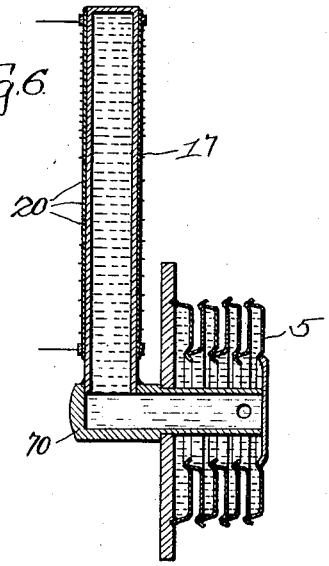
Inventor:
Lawrence M. Persons Patented Nov. 1, 1932

1,885,285

UNITED STATES PATENT OFFICE

LAWRENCE M. PERSONS, OF ST. LOUIS, MISSOURI, ASSIGNOR TO COOK ELECTRIC COMPANY, OF CHICAGO, ILLINOIS, A CORPORATION OF ILLINOIS

HEAT MOTOR

Application filed May 29, 1929. Serial No. 366,933.

My invention relates to heat motors and thermally controlled vapor motors and more particularly to a vapor motor adapted to be influenced by a volatile fluid, or like means, such as I have disclosed in my application Serial No. 37,091, filed June 15, 1925, of which this application is a division in part.

It has heretofore been proposed to provide, in a heat or vapor motor, a fluid pressure container for a volatile fluid and a heating element in heat-interchanging relation therewith, the latter developing the heat for vaporizing or expanding the fluid and the container. Various conditions exist in the practical adaptation of heat or vapor motors to various control devices. It is generally desirable, if not essential, that the initial movement be quick and that sluggishness of action be eliminated if devices of this type are to be considered practical for general use. The travel of the motor will vary in almost every case. The control of this movement has heretofore been obtained mainly by the insertion of a limit switch in circuit with the heating element to act as a cut-out when the motor reached predetermined travel or expansion.

Where a limit switch is used, the heat or vapor motor usually fails to act promptly, or as contemplated, to secure operation within a predetermined time due to improper positioning of the switch with relation to the heating element. On the other hand, a limit switch has proved generally unsatisfactory due to the possibility of failure of the switch and the resultant damage which is apt to occur if the pressure in the vapor motor is not checked at the proper time. If the vapor motor is embodied in a control governing, one or more automatic operations, failure of the switch to open the heating circuit will cause the vapor motor to fail in its operation, and obviously, in the case of an automatic mechanism, considerable damage is apt to result. Another undesirable disadvantage in the use of a limit switch is the constant fluctuation which the heat or vapor motor undergoes as the result of the repeated making and breaking of the circuit in order to maintain the motor at the proper point of expansion. Such fluctuation of the motor is not permissible in cases where the motor is relied upon to control regulating devices operating within a narrow range of movement by the motor.

I have found, on the other hand, that heat or vapor motors have heretofore been built around the device to be controlled and not as a standard unit capable of universal adaptation.

It is an object of my invention to provide a heat or vapor motor employing a volatile fluid which utilizes the expansion of the fluid as the power transmitting medium and which is provided with a heating chamber into which this volatile fluid extends a sufficient distance to be immediately influenced and rapidly forced out of the heating zone, by the heat effects, whereby to limit the expansion of the motor by the resulting displacement of the volatile fluid. Accordingly, a vapor motor embodying my invention may be produced as a unit capable of unlimited universal adaptation to control devices or regulators of various types and requirements, to secure the proper timed movement and power necessary to effect the desired operations.

As I have disclosed in my aforesaid parent application, further expansion of the fluid after it is driven out of the heating zone and into the contractible and expansible vessel may be controlled or checked by thermally disconnecting the heating chamber from the vessel. This is accomplished by the use of an interconnecting neck or joint of lower heat conductivity than the material of the walls of the heating chamber, so that further conduction of the heat to the volatile fluid is prevented and a thermal balance or equilibrium is thereby obtained. I have found, however, that, by the use of the same or identical structure, driving or depressing the volatile fluid out of the heating zone in itself is sufficient to limit the expansion of the contractible and expansible vessel inasmuch as this equilibrium or thermal balance will be obtained where the volatile fluid is out of direct contact with the heating zone.

Accordingly, my invention is defined more particularly by a heat or vapor motor having a substantially closed heating chamber into which the volatile fluid extends sufficiently to be in direct heat exchanging relation therewith, the proportions being such that the heating chamber will have preferably, although not necessarily, a fluid displacement substantially equal to the volumetric increase, upon expansion, of the expansible and contractible vessel whereby this vessel may be held at a predetermined limit of expansion.

Other objects and advantages of my invention will be apparent from the following description when taken in connection with the accompanying drawings, in which:

Fig. 3 is a view partly in section and partly in elevation of a heat motor wherein the expansible and contractible vessel is contracted upon expansion of the volatile fluid;

Figure 1:
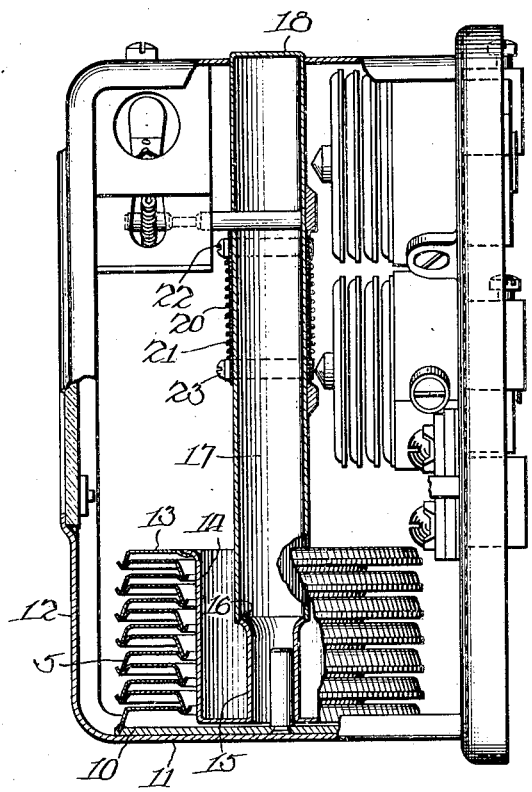
Figure 1 is a view partly in section and partly in elevation of a heat motor embodying the invention as incorporated in a regulator.

Figs. 4, 5, and 6 are likewise similar views illustrating different embodiments of my invention.

In the drawings, wherein for the purposes of illustration there are shown several preferred embodiments of my invention, the vapor or heat motor may comprise an expansible and contractible vessel 5 having a volatile fluid therein, such as benzol or toluene, and a tube 17 or boiler in communication with the vessel and which receives a portion of the liquid.

This vessel 5 is preferably shown as comprising a well-known form of bellows which readily expands or contracts upon an increase of pressure therein. Tube 17 may be closed at either end and communicate at the opposite end with vessel 5. As to the specific form of heating device that may be used, it is obvious that the source may be an electrical resistance coil or heating flame (not shown) conveniently located at or adjacent to tube 17. A heating zone will be provided within tube 17 for heating the volatile fluid and driving it into vessel 5 by volatilization. The pressure within the tube will be gradually increased until the level of the liquid is depressed, whereupon further volatilization stops as the liquid is driven out of the heating zone. As shown by the various forms of my invention, it may be by this means that a predetermined expansion or movement of vessel 5 may be effectively obtained and held without danger of the pressure within building up to a point where the vessel will burst, although, as I shall presently describe, the same result may be accomplished by employing a thermally insulated mounting which may be in the form of a neck 15 of smaller cross-sectional area than that of tube 17, or of a material of lower heat conductivity than the material of tube 17.

Referring now to Figure 1, the expansible and contractible bellows 5 is secured to a base 10. Base 10 may be secured to the bottom or base 11 of a housing 12. The upper movable end 13 of bellows 5 is suitably secured or sealed to a cup 14 lying centrally within the bellows. Cup 14 may be of considerable depth and is adapted to have a narrow hollow neck 15 formed therein. A liquid tight joint is then formed at the point 16 between neck 15 and vertical tube 17. Tube 17 is closed at its upper end, but is adapted to communicate with the interior of bellows 5 by means of hollow neck 15.

A heating element 20, which, in this particular instance, is in the form of an electrical resistance coil, suitably surrounds tube 17. This coil is, of course, electrically insulated from tube 17, but is in close proximity thereto to conduct the heat developed by the current flow through the coil between the highly volatile fluid within the tube and bellows. In this particular form of device, tube 17 and neck 15 are preferably of different materials. Heat is conducted through the tube to the volatile fluid therein to cause it to expand and to be driven through the neck in bellows 5. The conduction of heat to bellows 5 is, however, checked by means of neck 15, which may be of smaller cross-sectional area and of material of lower heat conductivity. Of the different kinds of material that may be used, I desire to mention that tube 17 may be of copper, while neck 15 may be of steel. The copper, being of greater conductivity, will permit the heat to expand the volatile fluid as long as it is within this tube, but further conduction of the heat is checked at the point 16, where the steel neck is secured to the lower end of tube 17. After the volatile fluid is driven into the bellows, I find that further expanding action of the bellows is substantially checked. This is due to several reasons, one of which may be that neck 15 is of a different material than tube 17, and consequently, the heat is not conducted as rapidly, and another of which is that the cross-sectional area of neck 15 is substantially smaller than that of tube 17. Moreover, the experiments which I have conducted have shown that where tube 17 is of a material of relatively high heat conductivity, such as copper, the conduction of heat may be checked to a satisfactory degree at point 16 when neck 15 is of smaller cross-sectional area only and when the material is of the same or different heat conductivity. On the other hand, I find that the same result can be accomplished when the cross-sectional area of the neck is disregarded and the material is of a predetermined heat conductivity, preferably lower, of course, and sufficient to prevent the heat from traveling to bellows 5. A sheet of electrical insulation 21 for heat coil 20 may be wrapped about tube 17 at a point where the heat coil 20 is mounted. Terminal bands 22 and 23 secure the ends of heat coil 20 in position and receive suitable connections of any electrical circuit.

In this form of device, heat developed at coil 20 causes a volatile fluid to expand by partial volatilization, the pressure increasing within the tube 17 to depress or lower the level of the volatile fluid and thereby driving the same out of the heating zone. As soon as the level of the volatile fluid lowers below the joint or point 16, further effective conduction of heat is prevented and bellows 5 is accordingly held at a predetermined expansion. This condition of thermal balance is maintained as long as the vapor pressure in tube 17 is maintained by the heat at coil 20. This device can be furnished with different power requirements which will produce different pressures and lengths of travel, this being dependent, of course, upon volumetric proportions provided between the bellows and the tube and the relation of the heat-interchange between the heating element and the volatile fluid within the tube. These various factors will be taken into consideration when providing the device with various characteristics. The movable part 13 of motor may have continuous expansion or contraction over a period of say several minutes for its stroke, or it may go through its full travel in a fraction of say a second after a predetermined time, this depending, of course, upon the type of control of regulator to which the motor will be adapted. It is desirable, when considering the volumetric relations or proportions between the bellows and tube, to provide the bellows of such an expansible or contractible capacity as to permit the displacement of the volatile fluid out of tube 17 without injuring or rupturing the walls of the bellows. This is a matter of relative importance, for, as I have disclosed in the aforesaid parent application, the displacement of the volatile fluid into bellows 5 will expand this bellows and hold it in its expanded position.

Figure 2:
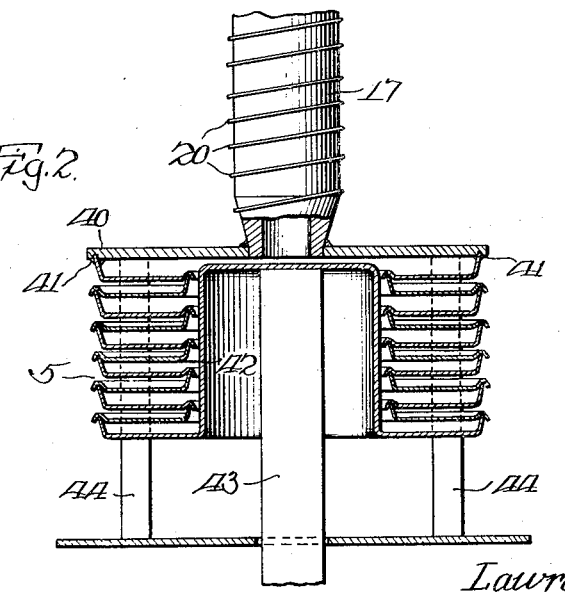
Fig. 2 is a sectional view illustrating the same heat motor in different form.

I have found, however, that the same results will be obtained if tube 17 is made of steel or other material of low heat conductivity, such as I have shown in Figure 2, as long as the level of the volatile fluid is depressed by the vapor pressure out of the heating zone. When tube 17 is made of steel, however, it is desirable that coil 20 is spaced the entire length of the tube. The heating zone extends, therefore, substantially the entire length of the tube, although not necessarily so, such as in the case of a copper tube, as disclosed in Figure 1. In the case of a copper tube, the heat is readily conducted from end to end irrespective of the extent to which the heat coil extends along this tube, while in the case of steel the heat not being readily conducted preferably requires this coil to extend along the walls of the tube. In either case, the result to be accomplished is the depression or the displacement of the volatile fluid out of the heating zone, or tube, into the bellows.

The heat or vapor motor disclosed in Figure 2 may comprise a tube 17 of a material of relatively low heat conductivity, such as steel, which is adapted to be hermetically sealed at its lower open end to a plate 40. The upper end of bellows 5 is hermetically sealed at 41 to this plate, while the lower end is furnished with an inwardly and upwardly projecting cup 42. An actuating member 43 may extend upwardly into contact with cup 42, whereby, upon expansion of bellows 5, this cup is depressed downwardly to actuate this member 43. In this case, plate 40 is held rigid by means of corner posts 44, suitably carried in rigid relation. It will be noted that the lower end of bellows 5 moves upon expansion, this being dependent, of course, upon the particular adaptation to which the vapor motor may be put.

It may be desirable in the construction of the heat or vapor motor to allow bellows 5 to contract instead of expand upon the power stroke. Such an arrangement may be obtained by providing a base 30, to which the lower open end of bellows 5 is hermetically sealed, as indicated at 31 in Figure 3. A housing or casing 32, which is slightly larger in diameter, is placed over bellows 5 so that its lower open end may be hermetically sealed to plate 30 at 33, thereby providing a closed chamber 34 into which the volatile fluid may be depressed or expanded to contract or depress this bellows. Tube 17 is also closed at its upper end and communicates with chamber 34 in any suitbale way, say by hermetically sealing the lower end of tube as indicated at 36 to casing 32. Plate 30 may be provided with a central opening 37 and an actuating arm 38 projected inwardly so as to be attached to the upper wall 39 of bellows 5.

In Figure 4 another form of my invention is disclosed. The lower end of tube 17 extends downwardly into a cup 50, such as I have shown in Figure 1, but the lower end of bellows 5 is movable instead of the upper end. In other words, in Figure 1 the upper end carrying tube 17 is movable upon expansion of bellows 5, but in Figure 4, the upper end is held rigid, and the lower end is allowed to move to operate actuating member 51. In this form, tube 17 is also preferably made of a material of low heat conductivity and coil 20 is arranged to be wound substantially from end to end of this tube.

I find that by applying the heat to tube 17 in a certain manner, volatilization and expansion of the fluid and the consequent expansion or movement of vessel 5 may be accurately controlled under a wide set of conditions; that is to say, the time required to complete the full stroke of a predetermined movement of vessel 5 may be ascertained and accordingly controlled so that the vapor motor may be used in regulators requiring practically any given set of timed operations. To accomplish this feature, as I have disclosed and claimed in my copending application Serial No. 331,690, filed January 10, 1929, the turns of heat coil 20 may be so spaced as to concentrate or localize the heat either initially or during subsequent operation along tube 17 and thereby effect volatilization of a portion of all the fluid in a given time. Spacing the turns of heat coil 20 more closely together at the top of tube 17 causes a relatively quick volatilization of the fluid at the upper end of the column so that rapid building up of pressure at this point takes place. Accordingly, the level of the fluid is rapidly depressed in this column to expand or move a greater volume of fluid into the vessel to accelerate initial expansion.

Generally, an advantage obtained by heating a portion only of the volatile fluid, such as in the mechanical structure herein shown of a tube 17, which may be varied, of course, without departing from the scope of the invention, resides in the fact that a major portion of the liquid remains comparatively cooled; that is to say, a relatively large portion of the volatile fluid confined within the bellows 5 is not subjected to the heat, and that after the volatile fluid in the tube 17, which is expanded somewhat and not vaporized, is depressed into the bellows, there is no possibility of further volatilization or expansion. Accordingly, the bellows will be held at its limit of travel until the thermal balance or equilibrium is destroyed by discontinuing the heat at the source 20 whence the vapor will completely condense and the fluid will rise in tube 17. Applying the heat in the manner described causes a rapid vaporization or building up of pressure within a confined space, namely, the upper end of the tube of a relatively small amount of volatile fluid whereby the rapid development of power results. It is preferable that the interior of the bellows 5 and tube 17 be substantially filled with the volatile fluid so as to eliminate the presence of an air pocket at the upper end of this tube. The presence of an air pocket tends to give the expanding action of the vapor motor a resiliency instead of a positive movement; that is to say, the initial pressure developed by the volatilization of the fluid tends to compress the air instead of depressing the fluid out of the tube to expand bellows 5. With the presence of air, the device is not positive, requires a longer time for initial movement, and is materially restricted in its power development. However, I do not desire to restrict my invention to the complete filling of the bellows and tube with this volatile fluid, although I have found such an arrangement highly desirable.

In Fig. 5 the form of my invention shown is essentially the same as shown in the other figures. However, in this instance, bellows 5 may be confined within a chamber defined by the walls 60 and a rigid cover plate 61. Tube 17 is hermetically sealed at 62 and communicates with the interior of the bellows, the latter having, however, a tube 63 extending downwardly to the lower movable end of this bellows. Tube 63 is rigidly secured to cover 61 and prevents any air that may have trapped within during the filling of the vapor motor from rising to the top of tube 17. If air is found to have been trapped within the vapor motor and to have risen to the top of tube 17, temporarily inverting the vapor motor will cause the air to travel along tube 17 and through tube 63 and escape into the bellows 5 through openings 64 or open end of tube 63, if a clearance is provided between the same and the bellows. Inverting the vapor motor in an upright position will permit the air bubbles to rise upwardly in bellows 5 and there remain, the arrangement of the tube 63 preventing them from again passing into and rising upwardly to the top of tube 17.

In Figure 6 I have disclosed another form of the invention wherein the axis of bellows 5 is substantially at right angles to tube 17. Obviously, various arrangements of this tube with respect to the bellows may be obtained. In this particular embodiment, the level of the volatile fluid is likewise depressed out of the heating zone into an interconnecting coupling 70 which communicates with the interior of bellows 5.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a device of the class described, the combination of a thermally controlled element having a part adapted to move when actuated, a substantially hollow member having at least one end in communication with the interior of said thermally controlled element, a volatile fluid substantially completely filling said element and said member, a heating element for said member arranged to influence said volatile fluid whereby to depress the level thereof into said controlled element to actuate said movable part, and means of a substantially low heat conductivity for interconnecting said member and said controlled element.

2. In a device of the class described, the combination of a thermally controlled element having a part adapted to move when actuated whereby one or more controlling members may be operated thereby, a member extending from said thermally controlled element in thermally insulated relation adapted to communicate with the interior thereof, a volatile fluid substantially completely filling said element and said member, and a heating element arranged to influence said volatile fluid contained within said member whereby to drive the level of said fluid into said thermally controlled element for actuating and limiting the movement of said movable part.

3. In a heat motor, means for predetermining the movement of said motor comprising a heating element arranged on a relatively non-expanding portion of said motor and capable of conducting the heat to the expanding portion, a volatile fluid substantially filling said non-expanding and said expanding portions, and means interconnecting said non-expanding portion with said expanding portion and tending to check the conduction of heat when the expanding portion reaches a predetermined position.

4. In a heat motor, the combination of a thermally controlled element of the bellows type having an expanding portion and a chamber in communication with the interior thereof, the walls of said chamber being of material of relatively high heat conductivity, and connecting means interposed between said walls and said bellows, said means having a substantially reduced mass and being of relatively low heat conductivity.

5. A heat motor comprising, in combination, an expansible and contractible vessel, a closed tube associated with and in communication with said vessel, a volatile fluid substantially completely filling said vessel and said tube, an electrically operated heat coil surrounding said tube to provide a heating zone within said tube for said volatile fluid whereby the heat will depress the level of said liquid into said vessel to expand the same, the expansion of said vessel being limited by the movement of said liquid out of said heating zone and maintained by a continuous flow of current through said heat coil.

6. In a heat motor comprising, in combination, an expansible and contractible vessel, a vertically extending tube connected to said vessel at the lower end and closed at the upper end, a volatile fluid substantially completely filling said vessel and said tube, a heat coil, a source of current, and means for closing the circuit of said heat coil to continuously maintain said coil energized and said vessel at a predetermined limit of expansion by vaporizing and forcing said liquid down in said tube and into said vessel, said vessel being held at said predetermined limit of expansion by the continued flow of current through said heat coil.

7. A heat motor comprising, in combination, an expansible and contractible vessel, a substantially vertically extending tube in communication with said vessel, a volatile fluid substantially completely filling said vessel and said tube, and a source of heat providing a heating zone for said tube into which the volatile fluid extends to vaporize a portion of this fluid and to drive the unvaporized portion below said heating zone, the vapor creating a pressure to maintain said fluid below said heating zone to expand said vessel a predetermined distance and to hold said vessel expanded at said predetermined distance as long as said source of heat continues and maintains said vapor pressure in said heating zone of said tube.

8. A heat motor comprising, in combination, an expansible and contractible vessel, a volatile fluid in said vessel, and heating means influencing said volatile fluid including control means for predetermining the expansion of said vessel and holding said vessel in a predetermined expanded position, said control means comprising a closed chamber substantially completely filled by said fluid but out of which said fluid is driven by said heating means and held depressed by the vapor pressure in said chamber, and a closed circuit furnishing a continuous flow of current for said heating means to maintain said vapor pressure in said chamber and said vessel at its said predetermined expanded position.

9. A heat motor comprising, in combination, an expansible and contractible vessel, a volatile fluid in said vessel, and heating means influencing said volatile fluid including control means for predetermining the expansion of said vessel and holding said vessel expanded, said control means comprising a chamber substantially completely filled by said fluid, and a continuously energized source of heat for vaporizing and forcing the unvaporized portion of the liquid out of said chamber, said vessel being held in its expanded position by the continuous application of heat at said chamber to maintain the vapor pressure therein and substantially all the unvaporized fluid in said vessel.

10. A heat motor comprising, in combination, an expansible and contractible vessel, a volatile fluid in said vessel, and heating means influencing said volatile fluid including control means for predetermining the expansion of said vessel and holding said vessel expanded, said control means comprising a chamber substantially completely filled by said fluid, said chamber having a fluid displacement capacity substantially equal to the volumetric increase of the interior capacity of said vessel upon expansion, and a continuous source of heat vaporizing said fluid to create a pressure in said chamber which depresses any remaining unvaporized fluid substantially out of said chamber into said vessel to expand the latter and to hold it expanded by the continuous application of heat maintaining the vapor pressure in said chamber and the unvaporized fluid in said vessel.

11. A heat motor comprising, in combination, an expansible and contractible vessel, a substantially vertically extending tube in communication with said vessel, a volatile fluid substantially completely filling said vessel and said tube and adapted to be vaporized within said tube for creating a pressure therein to drive the unvaporized fluid into said vessel to expand the same, and means for vaporizing said fluid including a closed circuit having a heat coil surrounding said tube, said closed circuit continuing the flow of current through said heat coil after vaporization and depression of the fluid in said tube thereoutof and into said vessel to create a thermal balance whereby to hold said vessel expanded, without further contraction or expansion, until said circuit is opened.

12. An electrically operated heat motor comprising an expansible and contractible vessel, a volatile fluid for said vessel, a heat coil, and means associating said heat coil with said expansible and contractible vessel whereby the heat developed by the continuous current flow in said heat coil will expand and maintain said fluid expanded to expand and continuously maintain said vessel at a predetermined limit of expansion.

In witness whereof, I have hereunto subscribed my name.

LAWRENCE M. PERSONS.